US010094010B2

(12) United States Patent
Smith et al.

(10) Patent No.: US 10,094,010 B2
(45) Date of Patent: Oct. 9, 2018

(54) COBALT-FREE, GALLING AND WEAR RESISTANT AUSTENITIC STAINLESS STEEL HARD-FACING ALLOY

(71) Applicant: The Ohio State University, Columbus, OH (US)

(72) Inventors: Ryan Thomas Smith, Findlay, OH (US); Tapasvi Lolla, Columbus, OH (US); Sudarsanam Suresh Babu, Knoxville, TN (US); David Wayne Gandy, China Grove, NC (US); John Albert Siefert, Huntersville, NC (US); Gregory J. Frederick, Harrisburg, NC (US); Lou Lherbier, Pittsburgh, PA (US); David Novotnak, Pittsburgh, PA (US)

(73) Assignee: THE OHIO STATE UNIVERSITY, Columbus, OH (US)

( * ) Notice: Subject to any disclaimer, the term of this patent is extended or adjusted under 35 U.S.C. 154(b) by 564 days.

(21) Appl. No.: 14/743,348

(22) Filed: Jun. 18, 2015

(65) Prior Publication Data
US 2015/0368766 A1   Dec. 24, 2015

Related U.S. Application Data

(60) Provisional application No. 62/014,498, filed on Jun. 19, 2014.

(51) Int. Cl.
| C22C 38/44 | (2006.01) |
| C22C 38/58 | (2006.01) |
| C22C 38/34 | (2006.01) |
| C21D 9/00  | (2006.01) |
| C21D 1/18  | (2006.01) |
(Continued)

(52) U.S. Cl.
CPC ............... *C22C 38/44* (2013.01); *B22F 3/15* (2013.01); *B22F 7/08* (2013.01); *B32B 15/01* (2013.01); *C21D 1/26* (2013.01); *C21D 6/004* (2013.01); *C21D 6/005* (2013.01); *C22C 33/0285* (2013.01); *C22C 38/00* (2013.01); *C22C 38/001* (2013.01); *C22C 38/02* (2013.01); *C22C 38/04* (2013.01); *F16K 25/005* (2013.01); *B22F 2003/248* (2013.01); *C21D 2211/001* (2013.01);
(Continued)

(58) Field of Classification Search
None
See application file for complete search history.

(56) References Cited

U.S. PATENT DOCUMENTS

| 3,165,400 A | 1/1965 | Roy et al. |
| 3,912,503 A | 10/1975 | Schumacher et al. |

(Continued)

FOREIGN PATENT DOCUMENTS

| WO | WO1993024673 | 9/1993 |
| WO | WO2010053431 | 5/2010 |

OTHER PUBLICATIONS

Machine-English translation of Chinese patent 101338385A, "Nitrogen-containing/high nitrogen stainless steel products and Method fo preparing same," Chunjiang Kuang et al. Jan. 7, 2009.*

*Primary Examiner* — Deborah Yee
(74) *Attorney, Agent, or Firm* — Trego, Hines & Ladenheim, PLLC; Brandon Trego; Jonathan Hines (57) ABSTRACT

A strain-hardenable stainless steel alloy includes hard secondary phases dispersed in an austenitic primary phase, the alloy including 0.3-0.6% nitrogen by weight.

8 Claims, 6 Drawing Sheets

(51) Int. Cl.

| | | |
|---|---|---|
| *B22F 3/15* | (2006.01) | |
| *B22F 7/08* | (2006.01) | |
| *B32B 15/01* | (2006.01) | |
| *B32B 15/18* | (2006.01) | |
| *C21D 6/00* | (2006.01) | |
| *C22C 38/04* | (2006.01) | |
| *C22C 38/02* | (2006.01) | |
| *C22C 38/00* | (2006.01) | |
| *F16K 25/00* | (2006.01) | |
| *C22C 33/02* | (2006.01) | |
| *C21D 1/26* | (2006.01) | |
| *B22F 3/24* | (2006.01) | |

(52) U.S. Cl.
CPC .... *C21D 2211/004* (2013.01); *C21D 2241/02* (2013.01); *Y10T 428/12979* (2015.01)

(56) References Cited

U.S. PATENT DOCUMENTS

| | | | |
|---|---|---|---|
| 4,803,045 A | | 2/1989 | Ohriner et al. |
| 4,929,419 A | * | 5/1990 | Wegman ................. C22C 38/58 |
| | | | 148/326 |
| 5,340,534 A | | 8/1994 | Magee |
| 5,660,939 A | | 8/1997 | Burdett |
| 8,430,075 B2 | | 4/2013 | Qiao et al. |
| 2005/0139294 A1 | | 6/2005 | Kim et al. |
| 2011/0217567 A1 | * | 9/2011 | Sandberg ................. B22F 7/04 |
| | | | 428/639 |

\* cited by examiner

COBALT-FREE, GALLING AND WEAR RESISTANT AUSTENITIC STAINLESS STEEL HARD-FACING ALLOY

BACKGROUND OF THE INVENTION

The present invention relates generally to a hard-facing alloy, and more particularly, the invention relates to a cobalt-free hard-facing alloy.

Hard-facing alloys are used for a variety of applications including: valve seats, valve stems, turbine blades, lawnmower blades, mixers, rollers, grinders, cutters, etc. These alloys offer a variety of properties including: high galling resistance, good wear resistance, high strength and erosion performance, corrosion performance, and high hardness. Most hard-facing alloys fall into one of three alloy categories: iron-based, nickel-based, and cobalt-based alloys. Cobalt-based alloys have been the industry standard for valve hardfacing applications for almost 50 years now, largely in-part due to their versatility over a wide range of applications. The two most notable of these are STELLITE 6 and 21. Unfortunately, for nuclear applications, these alloys tend to wear away with time and form radioactive isotopes such as $Co^{58}$ and $Co^{60}$.

During the past two decades, considerable attention has been placed on iron-based alloys, essentially modified-stainless steels, as these alloys can eliminate the concern of radiation build-up while still offering excellent wear, galling, and corrosion performance. Several iron-based, cobalt-free, "modified-stainless steels" are currently used by the nuclear industry primarily for valve seat applications including: NOREM, GALLTOUGH PLUS, NITRONIC 60, and TRISTELLE 5183. These alloys have met with limited success for various reasons including: solidification cracking during welding, poor weldability, cracking in service, poor wear properties at service temperatures, and poor acceptance by industry in general. Compositional analysis and phase stability calculations using today's more advanced prediction tools have described why many of these alloys have failed to meet the rigorous industry standards and applications.

Accordingly, there is a need for an improved alternative cobalt-free hard-facing alloy for use in the nuclear industry as well as other industries.

BRIEF SUMMARY OF THE INVENTION

This need is addressed by stainless steel hard-facing alloy with high performance against wear, galling, and corrosion.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

A new alloy will provide high galling, wear, and erosion resistance. The new alloy has been manufactured in a powder-form and may be applied via powder metallurgy-hot isostatic processing to a component to be protected from wear, such as a surface of a valve seat. The powder may be applied to a surface of a component and bonded thereto using conventional powder metallurgy processes.

As noted above, several existing hard-facing alloys are on the market today. Today, only a few of these are used in the power industry and are targeted primarily at improved galling resistance. An extensive review of the literature suggests that galling resistance in stainless steel iron-based alloys is achieved through two key contributions: high strain-hardening rate and high volume fraction of hard secondary phases. High strain-hardening is achieved by modification of the plastic deformation mechanism through lowering of stacking fault energy ("SFE") by nitrogen addition. Of course, the exact properties are dependent on the composition, processing, and resulting initial microstructure of the alloy.

The present invention is focused on understanding the role of each of these contributors in existing hard-facing iron-based alloys and then designing an optimized alloy that employs the contributors thereby minimizing potential detrimental phases. The results of the program have produced an alloy that has been designed around three significant attributes: (1) a high nitrogen super-saturation in the matrix to lower stacking fault energy (SFE) and alter strain-induced martensitic transformation; (2) a high volume fraction of hard secondary phases (carbides and nitrides); and (3) the use of proper processing using powder metallurgy-hot Isostatic processing (PM-HIP) and an optimized heat treatment.

For comparison, several prior art alloys are shown in Table 1a.

TABLE 1a

|  | NOREM | GALLTOUGH | EPRI H' Alloy | TRISTELLE 5183 | NITRONIC 60 |
| --- | --- | --- | --- | --- | --- |
| Carbon | 0.85-1.4 | 0.25 max | 0.3-0.85 | 1.7-2.0 | 0.001 to 0.25 |
| Manganese | 5.0-13.0 | 2.0-7.0 | 3.0-5.0 | NA | 6.0-16.0 |
| Silicon | 1.5-5.5 | 1.0-5.0 | 1.5-4.5 | 5.25-5.75 | 2.0-7.0 |

TABLE 1a-continued

|  | NOREM | GALLTOUGH | EPRI H' Alloy | TRISTELLE 5183 | NITRONIC 60 |
|---|---|---|---|---|---|
| Nickel | 4.0-12.0 | 2.0-7.75 | 3.0-7.0 | 8.5-10.5 | 3.0-15.0 |
| Chromium | 18.0-27.0 | 12.0-20.0 | 20.0-25.0 | 19.0-22.0 | 10.0-25.0 |
| Molybdenum | 0-6.0 | 3.0 max | 1.0-3.0 | NA | 4.0 max |
| Nitrogen | 0.1-0.3 | 0.35 max | 0.1-0.3 | NA | 0.001-0.4 |
| Vanadium | 0-1.0 | NA | NA | NA | 0.2 |
| Niobium | 0-1.0 | NA | NA | 8.0-9.0 | 0.1 |
| Titanium | 0-1.0 | NA | NA | 0.3-0.5 | NA |
| Tantalum | 0-1.0 | NA | NA | NA | NA |
| Copper | NA | 3.0 max | NA | NA | 4.0 max |
| Iron | Bal | Bal | Bal | Bal | Bal |

The new alloy chemistry and proposed ranges are shown in Table 1 b.

TABLE 1b

|  | Inventive Alloy Range | Inventive Alloy Example |
|---|---|---|
| Carbon | 0.9-1.3 | 1.21 |
| Manganese | 3.0-7.0 | 4.78 |
| Silicon | 1.5-4.0 | 3.34 |
| Nickel | 2.0-6.0 | 4.37 |
| Chromium | 21.0-27.0 | 25.73 |
| Molybdenum | 1.0-5.0 | 2.04 |
| Nitrogen | 0.30-0.60 | 0.46 |
| Vanadium | NA | NA |
| Niobium | NA | NA |
| Titanium | NA | NA |
| Tantalum | NA | NA |
| Copper | NA | NA |
| Iron | Bal | Bal |

Together, these attributes have produced an alloy that provides excellent galling and sliding wear properties at room temperature and all the way up through the 343° C. (650° F.) nuclear plant operating temperatures. Furthermore, the alloy rivals galling and slide wear performance of cobalt-based alloys such as STELLITE 6 and 21 across the operating range up through 343° C. (650° F.). Each of the alloy attributes are described more fully in the following paragraphs.

High Nitrogen Concentration

Figure 1:
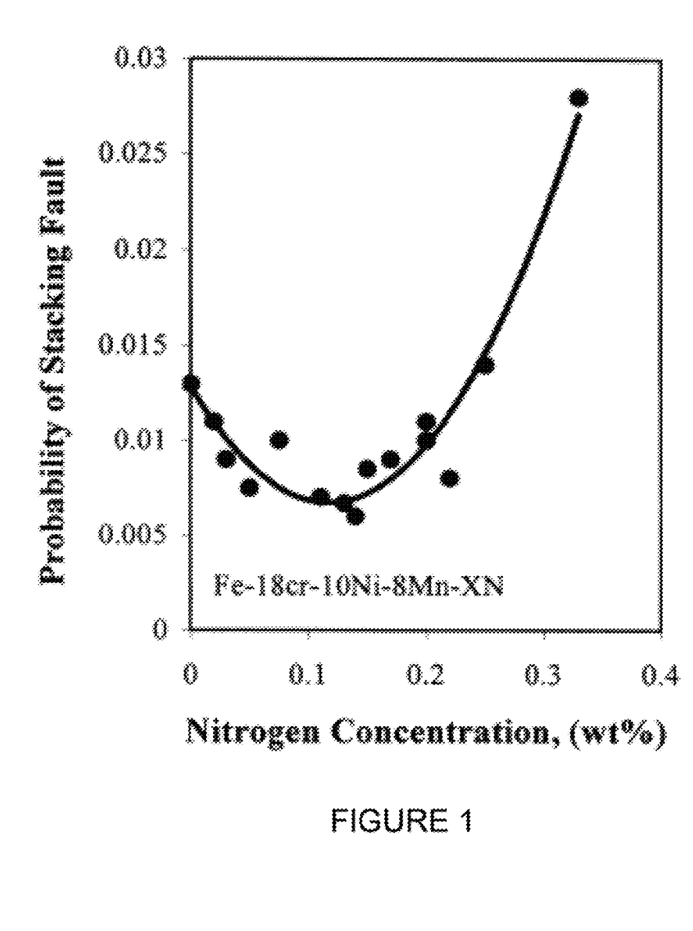
FIG. 1 shows experimental (X-ray diffraction, dots) and theoretical (line) stacking fault probability in a stainless steel alloy based on contributions of nitrogen segregation in a generalized stacking fault energy thermodynamic model.

Nitrogen is traditionally considered to be an austenite stabilizer in stainless steels and to raise the stacking fault energy. In conventional 18-8 stainless steels, such as 304 or 316, where typical nitrogen concentrations are low, nitrogen stabilizes the austenite phase and indeed raises the stacking fault energy. At high concentrations (>0.2 wt % N), however, nitrogen may dramatically lower the energy required to form stacking faults at a microscopic level, FIG. 1. The optimal range was found to be 0.44-0.55 wt % nitrogen in the present alloy. This effect has been attributed to a segregation or clustering effect of N to the stacking faults, accounting for its nonlinear effect on SFE.

Mechanistically nitrogen provides a significant influence on the plastic deformation mechanisms in austenitic stainless steels, primarily by altering the effective SFE. SFE in face-centered cubic ("FCC") metals is known to control the plastic deformation mechanism, with "forest" dislocation hardening occurring at high values, and progressing though extended stacking faults, twinning, and an FCC to hexagonal close-packed ("HCP") martensitic phase transformation as the SFE is lowered. As the plastic deformation mechanism changes with decreasing SFE, the strain hardening rate increases concurrently. Indeed, this same process occurs in cobalt-based alloys, which have a low SFE over a wide range of temperatures and compositions, and is posited to be a cause of their good wear and galling performance. Indeed, a higher work-hardening rate has been generally correlated with galling-resistance in stainless steels as well. In the present alloy, the presence of deformation twinning in high-temperature worn surfaces demonstrates that high concentrations of matrix nitrogen lower SFE substantially (e.g. to about 20-50 mJ/m$^2$) even at 343° C.

Thus the alloy described herein results in a twinning induced plasticity ("TWIP") steel at high temperature which represents a novelty in Co-free hard-facing alloys. Additionally, the incorporation of low-temperature strain-induced martensite, high volume-fraction of second phases, and a hot isostatic pressing ("HIP") process for weld-free hardfacing fabrication result in a novel finished product that has uniquely superior galling performance at high temperature.

Strain-Induced Martensitic Transformation

In austenitic stainless steels, additionally, a higher strain hardening rate can be achieved at low temperatures through a strain-induced FCC to BCC martensitic transformation. Some austenitic stainless steel alloys are based on an FCC phase which is metastable at room temperature. When strain or deformation is introduced to this family of austenitic alloys, the microstructure may undergo a transformation to a stronger, martensitic microstructure. The crystal structure of these martensitic structures can be HCP or base-centered cubic ("BCC") or body centered tetragonal ("BCT") or combinations thereof. Martensitic microstructures are known to provide increased erosion protection, wear resistance, and galling performance.

Two forms of martensitic structures have been observed to result from the transformation from austenite, including a martensitic BCC structure and an epsilon martensitic HCP. It is known that the ε-martensite transformation will result in a stable phase that is directly connected to a low, stacking fault energy. Correspondingly, the α-martensite formation results in a very stable BCC structure, which also provides good, wear resistance. In either case, the ability to readily form martensite under loading (strain/stress) is believed to be extremely beneficial in providing galling, wear, and erosion resistance to austenitic stainless steel alloys, primarily by affecting the strain-hardening rate. Indeed, the loss of the alpha martensite transformation, without a low SFE, has been connected with the degradation of wear properties with increasing temperature in some stainless-steel hardfacing.

Alpha martensite formation in stainless steels is considered a nucleation limited process, and thus requires high-energy defect sites for the transformation to occur. The generation of these defect sites is controlled by the underlying matrix deformation mechanism, which can be controlled by stacking fault energy. Nitrogen modification of the matrix has been shown to increase transformation kinetics in in-situ tensile testing. Thus, nitrogen changes to SFE can control deformation mechanisms over the entire temperature range of the alloy (room temperature to 350° C.), and increase strain hardening rate over this temperature range.

Nitrogen therefore acts to increase the strain-hardening rate across a range of temperatures by different plastic deformation mechanisms. At low temperature, a strain-induced FCC to BCC martensite is observed in deformed wear surfaces, whereas at high temperature (343° C.) the deformation mode changes to twinning induced plasticity. In each case, nitrogen acts through its effect on the stacking fault energy, which changes the micro-mechanics of the plastic deformation process and results in a higher strain-hardening rate over the entire range of considered temperatures. This results in a very small strain-hardened layer near the surface, which reduces the overall wear volume and delays the onset of the galling process to higher stresses.

High Volume of Secondary Phases

Heterogeneous microstructures composed of hard particles in a ductile matrix are known to improve abrasive and adhesive wear resistance. Overall wear rates are reduced by lowering interfacial adhesion, preventing surface deformation, and providing low-energy paths for wear particle formation. Additionally, the partitioning of plastic strain to the more ductile matrix increases the strain-induced martensite transformation and increases the strain-hardening rate. This increases the resistance to strain localization and increases galling resistance. These effects are commonly exploited in cermet (ceramic particles embedded in a metal matrix) cladding materials. In the alloy described herein, however, the hard second phases are engineered into the alloy chemistry and at an optimal volume fraction. This results in comparative long-term high-temperature stability, increased toughness, and improved thermal expansion matching (for part fabrication) while still retaining high wear and galling resistance at elevated temperatures.

Processing of the Hard-Facing Alloy

Figure 2:
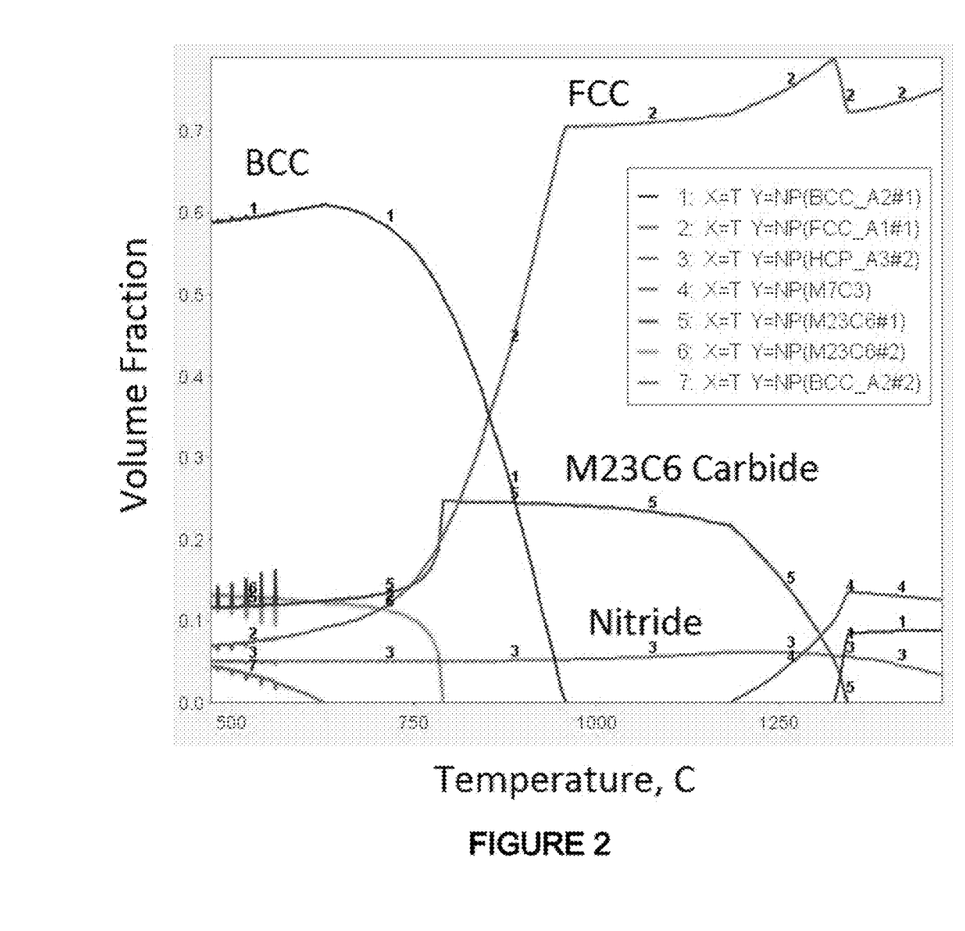
FIG. 2 illustrates equilibrium phase balance of an alloy of the present invention over processing temperature range predicted by thermodynamic modeling software.

The hard-facing alloy described herein is applied using a combination of powder metallurgy-HIP and an optimized solution annealing heat treatment to generate an appropriate microstructure. Powder metallurgy techniques offer superior microstructure, composition, and defect control compared to traditional weld-cladding or thermal-spray techniques. An initial step in hard-facing a component is to apply and bond a layer of the alloy in powder form to a component surface of the component, using conventional powder metallurgy techniques, and then to subject the component with the applied layer to a conventional HIP process. Considerable thermodynamic and phase modeling have been performed to establish proper alloy chemistry and heat treatment conditions. It was realized that producing a fully (or near fully) austenitic FCC matrix structure with a dispersed secondary hard phase at the HIP processing temperature would be desirable. Phase modeling suggested that a near fully austenitic FCC matrix structure could be produced at the HIP processing temperature, provided that a rapid cooling (quench) could readily be obtained following a certain time at the processing temperature, FIG. 2. Unfortunately most HIP units are air cooled and thus can take hours to reach room temperature.

As a result, it was elected to process the hard-facing alloy through the HIP processing temperature, for example about 1050° C., allow it to cool in air (as normal), reheat the alloy back to the solution annealing temperature (above 1100° C.), followed by a rapid water quench. The latter two steps (solution anneal and quench) permitted the alloy to form a fully austenitic microstructure upon cooling with a supersaturation of matrix nitrogen.

Figure 5:
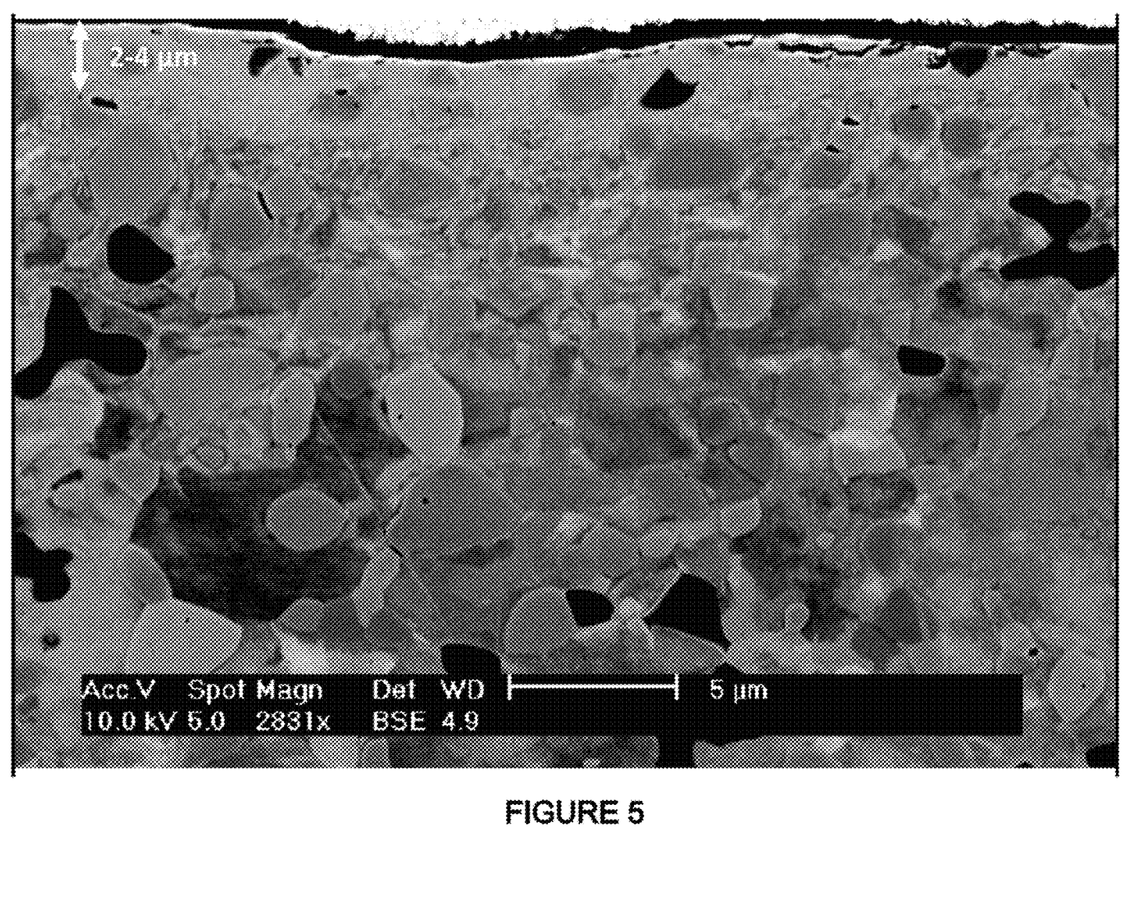
FIG. 5 shows surface galling wear produced for the alloy of the present invention during loading at 30 ksi at 350° C.
Figure 6:
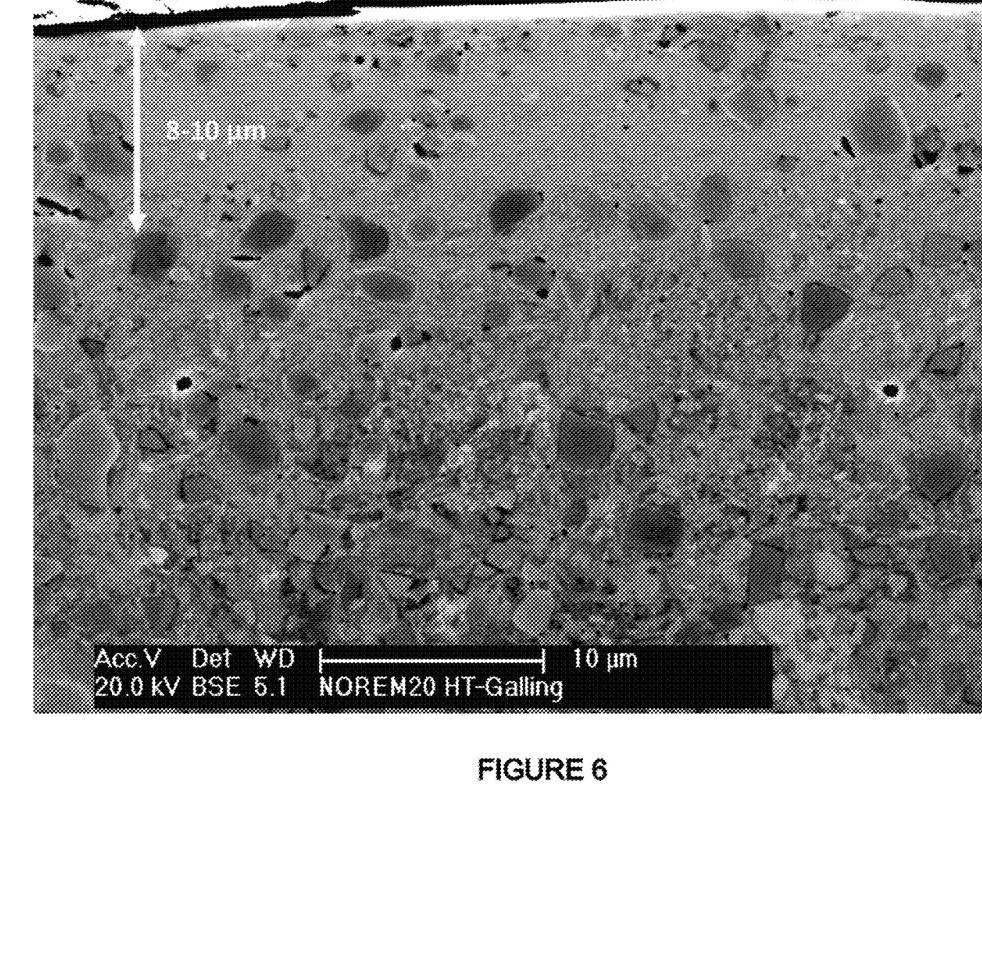
FIG. 6 shows surface galling wear produced for a NOREM alloy during loading at 35 ksi at 350° C.

Subsequently upon application of load (stress) as one might find on the surface of a valve seat, the austenitic structure is readily strain-hardened along a thin layer at the surface of the seat, FIG. 5, thereby confining deformation to a smaller surface layer and raising galling resistance. This is much improved compared to the layer produced by the NOREM alloy, FIG. 6. Thus, the alloy of the present invention provides a structure that has superior wear and galling performance. This structure (together with the proper alloying) readily produces galling resistance across the entire operating range of a nuclear power plant (room temperature through 350° C.).

No other Cobalt-free hard-facing alloy covers the range from room temperature to 350° C. operating temperature while providing good galling and wear performance. At elevated temperature ≤343° C. (650° F.), sliding wear conditions (such as a valve disc to seat), the alloy of the present invention shows comparable behavior to a standard Co-based hard-facing material (STELLITE 6). Additionally, and in reference to processing, the increased annealing temperature (1102° C. versus 1065° C.) further increases the sliding wear resistance, as shown in Table 2. For the tested conditions at ambient and elevated temperatures, the alloy of the present invention shows behavior that is vastly improved over traditional Fe-based hard-facing materials and is nearly equivalent in wear resistant as Co-based hard-facing materials like STELLITE 6.

TABLE 2

| ASTM G133 Sliding Wear Test Conditions | | Volume Loss (mm³) | | |
| --- | --- | --- | --- | --- |
| | | Inventive Alloy (1065° C. | Inventive Alloy (1102° C. | |
| Temperature | Stress | Anneal) | Anneal) | STELLITE 6 |
| 68° F., 20° C. | 15 ksi, 103.4 MPa | 0.023 | 0.026 | 0.013 |
| 650° F., 343° C. | 15 ksi, 103.4 MPa | 0.086 | 0.058 | 0.040 |

Figure 3:
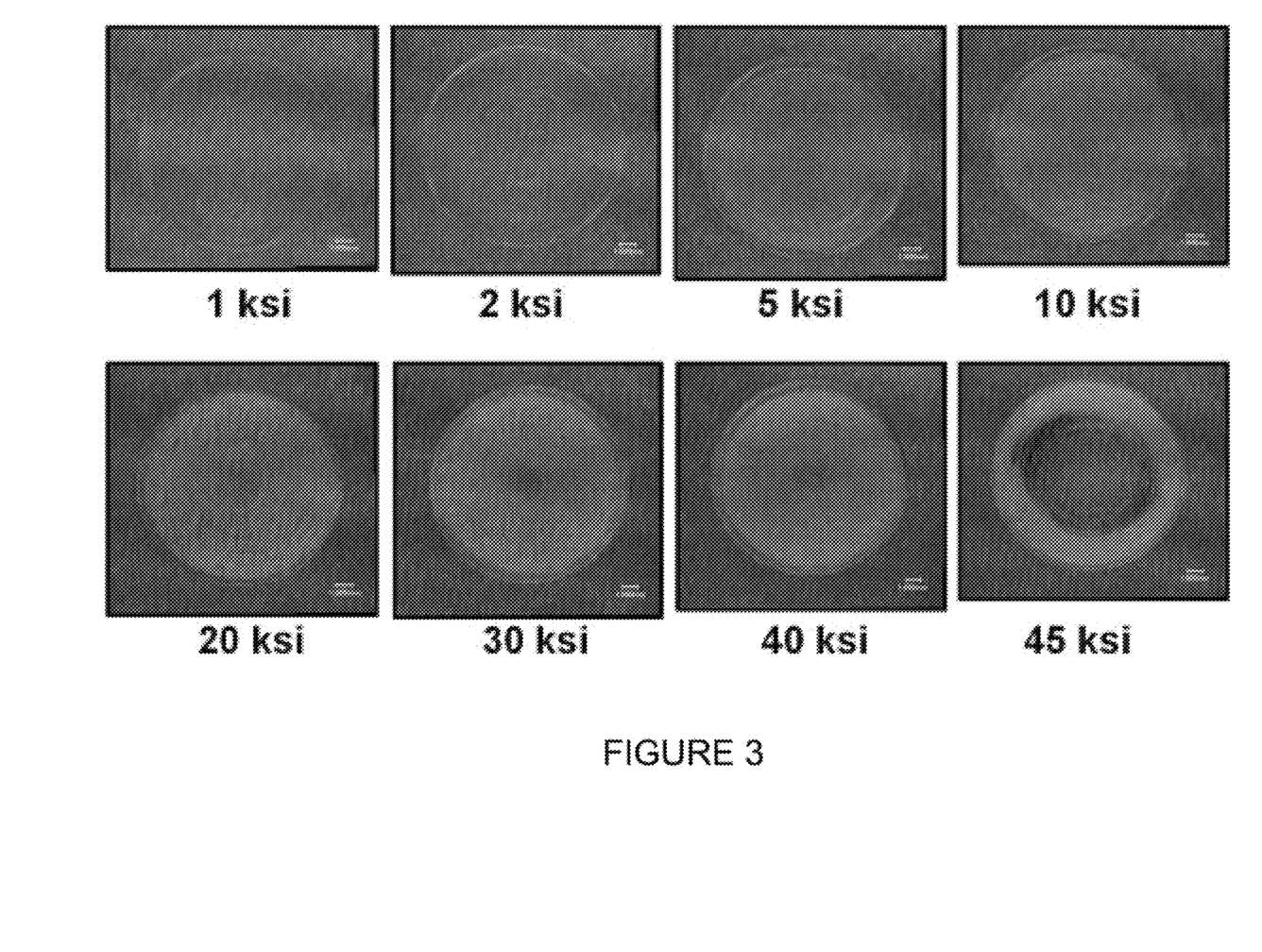
FIG. 3 shows galling results for STELLITE 6 block specimen tested at (343° C.) (650° F.) and indicated stress level.
Figure 4:
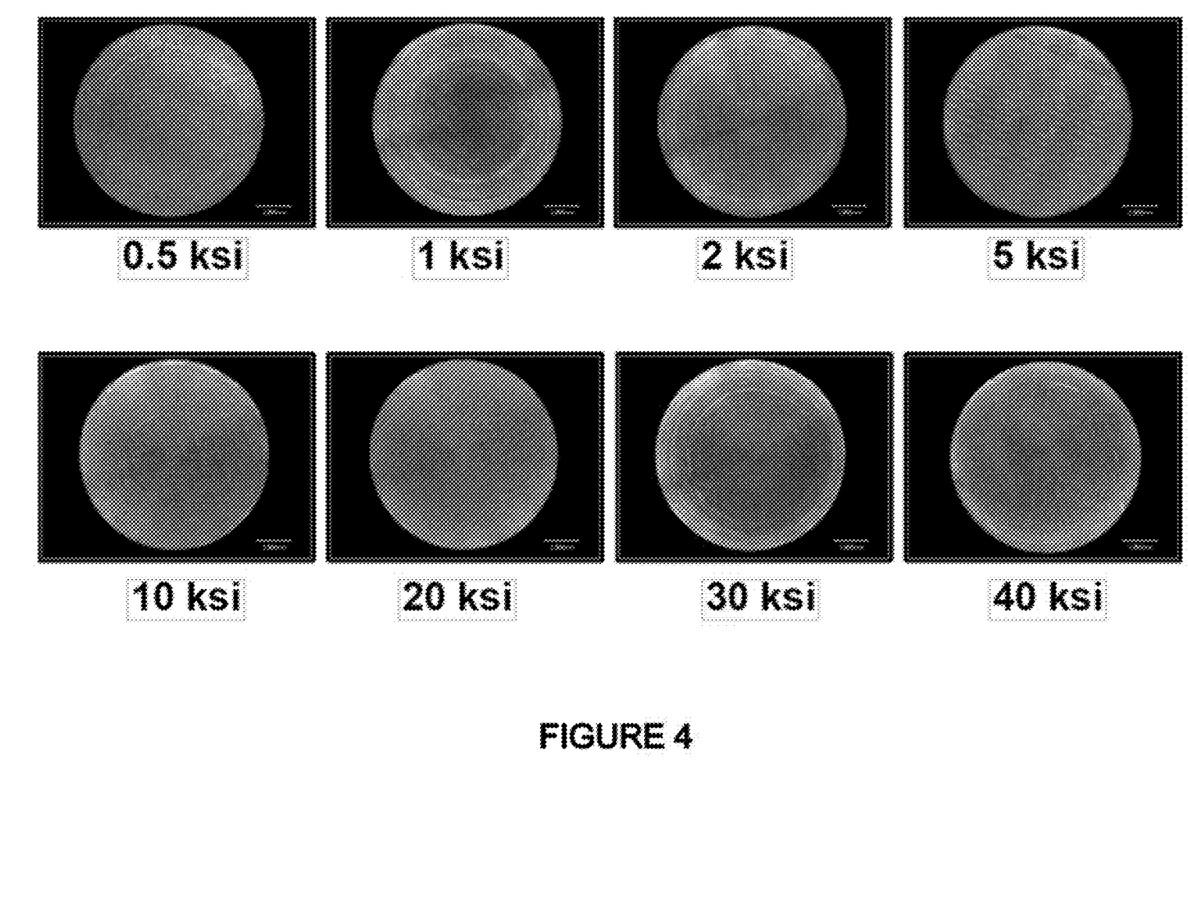
FIG. 4 shows galling results for the alloy of the present invention (1102° C. Anneal) block specimen tested at 343° C. (650° F.) and indicated stress level.

To verify the resistance to galling under sliding wear conditions, ASTM G98 galling tests were conducted and are provided in FIGS. 3 and 4. As shown, the wear scars on the block specimens for the alloy of the present application (1102° C. anneal) and STELLITE 6 are comparable in appearance and in the magnitude of the surface damage. A threshold galling stress is not easily determined for the alloy of the present application as there was no tendency to macroscopic galling deformation under the indicated, applied stress values in FIG. 4. These results confirm the superiority of the alloy of the present application for demanding valve applications where the applied service conditions (i.e. temperature and stress) may induce significant galling in seats and discs for less-resistant materials.

The foregoing has described a cobalt-free hard-facing alloy. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A method of making a hard-faced metallic component, comprising:
bonding a layer of a stainless steel alloy in powder form to a surface of a metallic component, such that the layer defines an outer surface, wherein the stainless steel alloy is void of cobalt and comprises hard secondary phases dispersed in an austenitic primary phase, the alloy consisting essentially of, by weight: 21.0 to 27.0% chromium; 3.0 to 7.0% manganese; 2.0 to 6.0% nickel; 1.5 to 4.0% silicon; 1.0 to 5.0% molybdenum; 0.9 to 1.3% carbon; 0.44-0.55% nitrogen; the balance iron and impurities;
hot isostatic pressing ("HIP") the layer at a HIP temperature to bond the layer to the component; allowing the layer to cool in air;
heating the layer to a solution annealing temperature greater than the HIP temperature;
and quenching the layer in water.

2. The method of claim 1, wherein the HIP temperature is approximately 1050° C.

3. The method of claim 1, wherein the solution annealing temperature is above 1100° C.

4. The method of claim 1, wherein the alloy consists essentially of, by weight: 25.73% chromium; 4.78% manganese; 4.37% nickel; 3.34% silicon; 2.04% molybdenum; 1.21% carbon; 0.46% nitrogen; the balance iron and impurities.

5. The method of claim 1, wherein the hard phases comprise at least one of a carbide and a nitride.

6. The method of claim 1, further comprising subjecting the component to mechanical stress to strain-harden a thin layer of the hard-facing alloy at the external surface.

7. A method of making a hard-faced metallic component, comprising:
bonding a layer of a stainless steel alloy in powder form to a surface of a metallic component, such that the layer defines an outer surface, wherein the stainless steel alloy is void of cobalt and comprises hard secondary phases dispersed in an austenitic primary phase, the alloy consisting essentially of, by weight: 21.0 to 27.0% chromium; 3.0 to 7.0% manganese; 2.0 to 6.0% nickel; greater than 3 to 4.0% silicon; 1.0 to 5.0% molybdenum; 0.9 to 1.3% carbon; 0.3-0.6% nitrogen; the balance iron and impurities;
hot isostatic pressing ("HIP") the layer at a HIP temperature to bond the layer to the component; allowing the layer to cool in air;
heating the layer to a solution annealing temperature greater than the HIP temperature;
and quenching the layer in water.

8. The method of claim 7, wherein the alloy consists essentially of, by weight: 21.0 to 27.0% chromium; 3.0 to 7.0% manganese; 2.0 to 6.0% nickel; 3.34% silicon; 1.0 to 5.0% molybdenum; 0.9 to 1.3% carbon; 0.44-0.55% nitrogen; the balance iron and impurities.

* * * * *